US011700307B2

(12) United States Patent
Yao

(10) Patent No.: US 11,700,307 B2
(45) Date of Patent: *Jul. 11, 2023

(54) INTERNET OF THINGS GATEWAY CONTENT RECEIVER

(71) Applicant: DISH Wireless L.L.C., Englewood, CO (US)

(72) Inventor: Kevin Yao, Cheyenne, WY (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/665,255

(22) Filed: Feb. 4, 2022

(65) Prior Publication Data

US 2022/0159076 A1  May 19, 2022

Related U.S. Application Data

(63) Continuation of application No. 16/657,812, filed on Oct. 18, 2019, now Pat. No. 11,277,476.

(51) Int. Cl.
*H04L 67/12* (2022.01)
*G06F 3/0482* (2013.01)
*G06F 3/04845* (2022.01)
*H04L 41/069* (2022.01)

(52) U.S. Cl.
CPC ............ *H04L 67/12* (2013.01); *G06F 3/0482* (2013.01); *G06F 3/04845* (2013.01); *H04L 41/069* (2013.01)

(58) Field of Classification Search
CPC ....... H04L 67/12; H04L 41/069; H04L 41/22; G06F 3/0482; G06F 3/04845
See application file for complete search history.

(56) References Cited

U.S. PATENT DOCUMENTS

| | | |
|---|---|---|
| 5,096,180 A | 3/1992 | Nagaoka et al. |
| 5,881,723 A | 3/1999 | Wallace et al. |
| 6,667,693 B1 | 12/2003 | Kim et al. |
| 7,365,769 B1 | 4/2008 | Mager |
| 9,451,573 B2 | 9/2016 | Erickson et al. |
| 9,679,487 B1 | 6/2017 | Hayward |
| 9,781,696 B1 | 10/2017 | Soave |
| 10,057,173 B2 | 8/2018 | Seed et al. |
| 10,547,731 B2 | 1/2020 | Kim et al. |
| 10,963,347 B1 | 3/2021 | Chen et al. |
| 11,277,476 B2 * | 3/2022 | Yao ..................... G06F 3/04845 |
| 2007/0090929 A1 | 4/2007 | Kim |
| 2012/0188275 A1 | 7/2012 | Shimazu et al. |

(Continued)

OTHER PUBLICATIONS

Semtech, "SX1272/73—860 MHz to 1020 MHz Low Power Long Range Transceiver," SX1272/73, Datasheet, Jan. 2019, 129 pages.

*Primary Examiner* — Joseph H Feild
*Assistant Examiner* — Rufus C Point
(74) *Attorney, Agent, or Firm* — Seed IP Law Group LLP

(57) ABSTRACT

A method and a content receiver configured as an Internet of Things (IoT) gateway are provided. The content receiver receives a first signal transmitted by an IoT device in accordance with an IoT protocol and demodulates and decodes the first signal. The content receiver generates one or more Internet protocol (IP) packets or non-IP packets representative of the first signal and sends the one or more IP packets or non-IP packets to an external server.

20 Claims, 9 Drawing Sheets

(56) References Cited

U.S. PATENT DOCUMENTS

| | | |
|---|---|---|
| 2014/0108943 A1 | 4/2014 | Lee et al. |
| 2014/0277597 A1* | 9/2014 | Le Sant ............... H04L 63/1433 700/20 |
| 2015/0006719 A1 | 1/2015 | Gupta et al. |
| 2015/0356949 A1 | 12/2015 | Kim |
| 2016/0007288 A1 | 1/2016 | Samardzija et al. |
| 2016/0080680 A1* | 3/2016 | Choi ................... H04N 21/482 348/728 |
| 2016/0088049 A1 | 3/2016 | Seed et al. |
| 2016/0307429 A1* | 10/2016 | Hood ................... G16H 40/63 |
| 2016/0342316 A1 | 11/2016 | Cho et al. |
| 2016/0379165 A1 | 12/2016 | Moakley |
| 2017/0063566 A1* | 3/2017 | Seminario ............... H04L 67/12 |
| 2017/0164417 A1 | 6/2017 | Kress et al. |
| 2017/0180489 A1 | 6/2017 | Oh et al. |
| 2017/0187642 A1 | 6/2017 | Nolan et al. |
| 2018/0077449 A1 | 3/2018 | Herz |
| 2018/0121035 A1 | 5/2018 | Filippi et al. |
| 2018/0167228 A1 | 6/2018 | Elcock et al. |
| 2018/0262866 A1 | 9/2018 | Haverinen et al. |
| 2018/0288209 A1 | 10/2018 | Kim et al. |
| 2018/0307383 A1 | 10/2018 | Faulkner et al. |
| 2019/0007511 A1 | 1/2019 | Rodriguez et al. |
| 2019/0034247 A1 | 1/2019 | Das et al. |
| 2019/0037361 A1 | 1/2019 | Nakamura |
| 2019/0058586 A1 | 2/2019 | Kumar et al. |
| 2019/0166088 A1 | 5/2019 | Krochik et al. |
| 2019/0236210 A1 | 8/2019 | Makaremi et al. |
| 2019/0253280 A1 | 8/2019 | Sano et al. |
| 2019/0313225 A1* | 10/2019 | Gitlin ................... H04W 4/70 |
| 2019/0361847 A1 | 11/2019 | Thomson |
| 2020/0037125 A1 | 1/2020 | Neuert |
| 2020/0153873 A1 | 5/2020 | Kwatra et al. |
| 2020/0169522 A1 | 5/2020 | Lee et al. |
| 2020/0177671 A1 | 6/2020 | Tofighbakhsh et al. |
| 2020/0327758 A1 | 10/2020 | Ma et al. |

* cited by examiner

INTERNET OF THINGS GATEWAY CONTENT RECEIVER

BACKGROUND

Technical Field

This application is directed to a content receiver configured as an Internet of Things (IoT) gateway and, in particular, a content receiver that provides a user interface (UI) for IoT devices.

Description of the Related Art

IoT devices are becoming increasingly prevalent in a variety of commercial applications. IoT devices are incorporated in smart home devices, appliances, lighting fixtures, home security systems, and cameras, among others. During operation, an IoT device may exchange data, over the Internet, with a server, whereby the IoT device may send data representative of a condition or quantity sensed by the IoT device to the server.

BRIEF SUMMARY

In an embodiment, a system includes an Internet of Things (IoT) device including a transceiver configured to transmit a first signal in accordance with an IoT protocol and a content receiver configured as an IoT gateway. In an embodiment, the content receiver includes an IoT transceiver configured to: receive the first signal; demodulate and decode the first signal; and output data representative of the first signal. In an embodiment, the content receiver includes a controller configured to: receive the data representative of the first signal; generate one or more packets, which may be Internet protocol (IP) packets or non-IP packets, representative of the first signal; and output the one or more packets representative of the first signal. In an embodiment, the content receiver includes a network interface configured to: receive the one or more packets representative of the first signal; and send the one or more packets to an external server.

In an embodiment, the controller is configured to: determine whether an alert is configured for the IoT device; and when the alert is configured, evaluate the data representative of the first signal; determine to display the alert based on the data representative of the first signal; and in response to determining to display the alert, cause the alert to be displayed on a display coupled to the content receiver. In an embodiment, the controller is configured to: cause the alert to be displayed by displaying a popup representing the alert on the display; and superpose the popup on content displayed on the display.

In an embodiment, the controller is configured to: display the alert together with a first command button permitting a user to acknowledge the alert; and in response to receiving selection from the user of the first command button, cease display of the alert. In an embodiment, the controller is configured to cause an IoT device configuration menu to be displayed, the IoT device configuration menu presenting: a command for a user to add and remove IoT devices with which the content receiver communicates; and a command for the user to specify, for each IoT device, whether to display a respective alert originating from the IoT device. In an embodiment, the controller is configured to: display the alert including an image or video captured by the IoT device.

In an embodiment, the IoT device is a sensor and the first signal represents a condition or quantity sensed by the IoT device.

In an embodiment, a method includes receiving, by a content receiver configured as an Internet of Things (IoT) gateway, a first signal transmitted by an IoT device in accordance with an IoT protocol; demodulating and decoding the first signal; generating one or more packets, which may be Internet protocol (IP) packets or non-IP packets, representative of the first signal; and sending the one or more packets to an external server.

In an embodiment, the method includes determining whether an alert is configured for the IoT device; and when the alert is configured, evaluating the first signal; determining to display the alert based on the first signal; and in response to determining to display the alert, causing the alert to be displayed on a display coupled to the content receiver. In an embodiment, the method includes causing the alert to be displayed by displaying a popup representing the alert on the display; and superposing the popup on content displayed on the display.

In an embodiment, the method includes displaying the alert together with a first command button permitting a user to acknowledge the alert; and in response to receiving selection from the user of the first command button, ceasing display of the alert.

In an embodiment, the method includes causing an IoT device configuration menu to be displayed, the IoT device configuration menu presenting: a command for a user to add and remove IoT devices with which the content receiver communicates; and a command for the user to specify, for each IoT device, whether to display a respective alert originating from the IoT device. In an embodiment, the method includes displaying the alert including an image or video captured by the IoT device. In an embodiment, the method includes the IoT device is a sensor and the first signal represents a condition or quantity sensed by the IoT device.

In an embodiment, a content receiver includes an Internet of Things (IoT) transceiver configured to: receive a first signal transmitted by an IoT device in accordance with an IoT protocol; demodulate and decode the first signal; and output data representative of the first signal. In an embodiment, the content receiver includes a controller configured to: receive the data representative of the first signal; generate one or more packets, which may be Internet protocol (IP) packets or non-IP packets, representative of the first signal; and output the one or more packets representative of the first signal. In an embodiment, the content receiver includes a network interface configured to: receive the one or more packets representative of the first signal; and send the one or more packets to an external server.

In an embodiment, the controller is configured to: determine whether an alert is configured for the IoT device; and when the alert is configured, evaluate the data representative of the first signal; determine to display the alert based on the data representative of the first signal; and in response to determining to display the alert, cause the alert to be displayed on a display coupled to the content receiver.

In an embodiment, the controller is configured to: cause the alert to be displayed by displaying a popup representing the alert on the display; and superpose the popup on content displayed on the display. In an embodiment, the controller is configured to: display the alert together with a first command button permitting a user to acknowledge the alert; and in response to receiving selection from the user of the first command button, cease display of the alert. In an embodiment, the controller is configured to: display the alert including an image or video captured by the IoT device.

DETAILED DESCRIPTION

Figure 1:
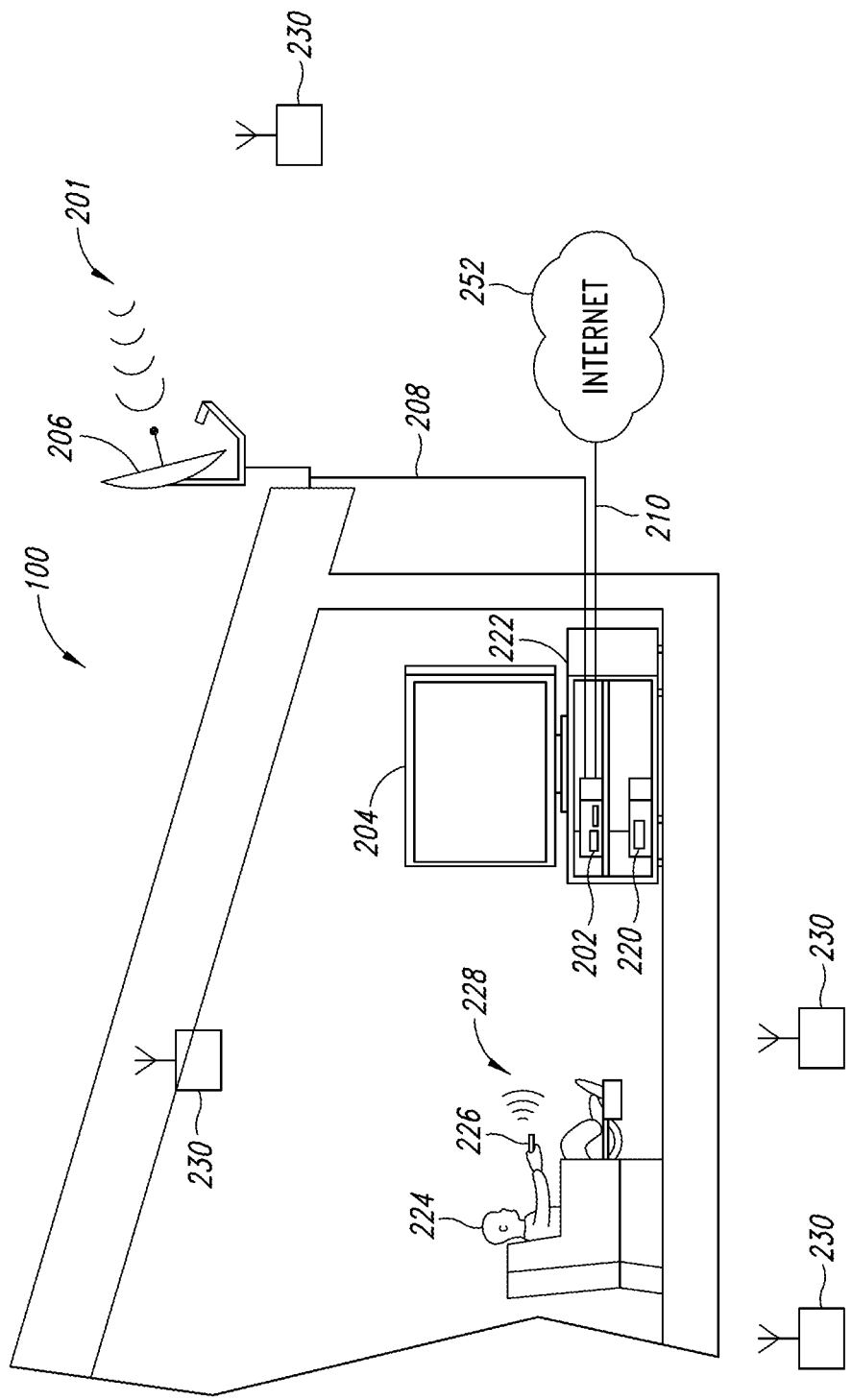
FIG. 1 illustrates an exemplary media subscription service environment that includes a content receiver.

In this specification, embodiments of the present disclosure illustrate a subscriber satellite television service as an example. This detailed description is not meant to limit the disclosure to any specific embodiment. The present disclosure is equally applicable to cable television systems, broadcast television systems, Internet streaming media systems, or other television or video distribution systems that include user hardware, typically in the form of a content receiver or set-top box supported by the media provider or by a third party maintenance service provider. Such hardware can also include, for example, digital video recorder (DVR) devices and/or digital-video-disc (DVD) recording devices or other accessory devices inside, or separate from, the set-top box.

Throughout the specification, the term "subscriber" refers to an end user who is a customer of a media service provider and who has an account associated with the media service provider. Subscriber equipment resides at the subscriber's address. The terms "user" and "viewer" refer to anyone using part or all of the home entertainment system components described herein.

One skilled in the art will recognize that the present disclosure can also apply to other types of systems that offer technical support to end users. Such systems can include computer systems, networking systems, telephone systems, industrial equipment systems, medical equipment systems, and the like. While the disclosure shows and describes media-related embodiments, it will be understood by those skilled in the art that various other changes in the form and details may be made therein without departing from the spirit and scope of the invention.

The disclosure uses the term "signal" in various places. One skilled in the art will recognize that the signal can be any digital or analog signal. Those signals can include, but are not limited to, a bit, a specified set of bits, an A/C signal, or a D/C signal. Uses of the term "signal" in the description can include any of these different interpretations. It will also be understood to one skilled in the art that the term "connected" is not limited to a physical connection but can refer to any means of communicatively or operatively coupling two devices.

As a general matter, the disclosure uses the term content receiver as a broad term that includes a television converter, receiver, set-top box, television receiving device, television receiver, television recording device, satellite set-top box, satellite receiver, cable set-top box, and cable receiver, and content receiver, to refer to electronic equipment that has the capacity to acquire, process and distribute for viewing one or more television signals transmitted by broadcast, cable, telephone or satellite distributors. DVR and "personal video recorder (PVR)" refer interchangeably to devices that can record and play back television signals and that can implement playback functions including, but not limited to, play, fast-forward, rewind, and pause. As set forth in this specification and the figures pertaining thereto, DVR and PVR functionality or devices can be combined with a content receiver. The signals transmitted by these broadcast, cable, telephone, satellite, or other distributors can include, individually or in any combination, Internet, radio, television or telephonic data, and streaming media.

As yet another general matter, it will be understood by one skilled in the art that the term "television" refers to a television set or video display that can contain an integrated television converter device, for example, an internal cable-ready television tuner housed inside a television or, alternatively, connected to an external television converter device such as an external set-top box connected via cabling to a television. A further example of an external television converter device is the EchoStar Hopper combination satellite set-top box and DVR.

In the figures, identical reference numbers identify similar features or elements. The sizes and relative positions of the features in the figures are not necessarily drawn to scale.

Turning now to the drawings, FIG. 1 illustrates an exemplary media subscription service environment that includes a content receiver system 100. A basic content receiver system 100 includes a content receiver 202, also called a set-top box in some systems, communicatively coupled to a source of media content, for presentation on a display 204. The media content is provided as a media signal 201.

In the exemplary embodiment shown in FIG. 1, the content receiver system 100 is a home media entertainment system, and the media signal 201 is a satellite signal received by a rooftop-mounted satellite receiving antenna 206. The content receiver 202 receives media content from the satellite receiving antenna 206 via a communication link 208.

While the content receiver 202 is described herein as being connected to a satellite receiving antenna 206, in other embodiments the content receiver 202 can receive media content from other sources. For example, the content receiver 202 can receive media content via an antenna which receives terrestrial broadcast signals. Alternatively, the content receiver 202 can receive media content via the media signal 201 received via a broadband cable subscriber service. Additionally or alternatively, the content receiver 202 can receive media content via the media signal 201 received directly from the Internet 252 via a network communication link 210, using an Internet-based media subscription service. Furthermore, a content provider may provide to the subscriber multiple media signals 201 via satellite (as shown) and/or via the Internet 252, broadband cable and/or Internet, or in any other suitable way.

The content receiver 202 can be coupled to a television, or the content receiver 202 can be in the form of hardware built into a television, wherein the set-top box receives content from the media service provider. Alternatively, the content receiver 202 can be any electronic device that receives media content by accessing the Internet 252; for example, a gaming console, a smart phone, a tablet computer, a laptop computer, or a desktop computer.

The display 204 can be any kind of video display device such as a cathode ray tube display, a liquid crystal display (LCD), a plasma display, a television, a computer monitor, a rear projection screen, a front projection screen, a heads-up display, or any other electronic display device. The display 204 can include audio speakers, or the display 204 can be coupled to separate audio speakers. The term "for display" as used herein generally includes presentation of an audio component as well as a video component of the media signal 201.

The communication links 208 and 210 typically are wired connections such as one or more coaxial cables. One skilled in the art will recognize that other methods and other systems of delivering the media signal 201 to the content receiver 202 may be possible. For example, one or both of the communication links 208 and 210 can be wireless links.

The content receiver 202 optionally further includes one or more peripheral devices 220 such as a media playback device including, but not limited to, a DVD player, a VCR, a stereo, a television, a game console, or a stand-alone DVR device that provides an alternate source of content directly to the display 204 via a wireless or a wired connection 222. Any of the peripheral devices 220 can be subscriber-owned devices, or they can be supplied by the media subscription service.

A remote control 226 can be operated by a user, for example, a subscriber 224, to cause the content receiver 202 to display received content on the display 204. The remote control 226 may also be used by a viewer to display a programming guide and to communicate program selections to the content receiver 202. The remote control 226 is communicatively coupled to the content receiver 202 via a wireless path 228, for example, an infrared (IR) signal. The remote control 226 can be used to send commands to the satellite content receiver 202, including channel selections, display settings, and DVR instructions. The wireless path 228 can use, for example, infrared or UHF transmitters within the remote control 226. One example of an embodiment of the remote control 226 is the EchoStar Technologies Corporation 40.0 Remote Control that includes an IR transmitter and an ultra-high frequency (UHF) transmitter. The remote control 226 may be able to send signals to the other peripheral devices 220 that form part of the content receiver system 100. The content receiver 202 may also be able to send signals to the remote control 226, including, but not limited to, signals to configure the remote control 226 to operate the other peripheral devices in the content receiver system 100. In some embodiments, the remote control 226 has a set of Light Emitting Diodes (LEDs). Some remote controls can include Liquid Crystal Displays (LCDs) or other screens. The remote control 226 can include buttons, dials, or other man-machine interfaces. While the remote control 226 can often be the common means for a user to communicate with the satellite content receiver 202, one skilled in the art will recognize that other means of communicating with the content receiver 202 are available, including, but not limited to, attached keyboards, smart phones, front panel buttons or touch screens.

The satellite receiving antenna 206 receives media content via the media signal 201 from one or more satellite transponders in earth orbit. Each satellite transponder is, for purposes of the content receiver system 100, a source of content that transmits one or more media channels to the satellite receiving antenna 206. A satellite television distributor can transmit one or more satellite television signals to one or more satellites. Satellite television distributors can utilize several satellites to relay the satellite television signals to the subscriber 224. Each satellite can have several transponders. Transponders transmit the satellite signal from the satellite to the satellite receiving antenna 206.

The environment also includes a plurality of Internet of Things (IoT) devices 230. An IoT device 230 may be a sensor, an alarm or a controller, among others. For example, the IoT device 230 may be a lighting fixture, a thermostat, a home security system device, such as a camera or a motion detector, a home appliance, a water, moisture or leakage detector, a sprinkler a smoke detector, or a carbon monoxide detector, among others. The IoT device 230 may wirelessly communicate with the content receiver 202 as described herein.

Figure 2:
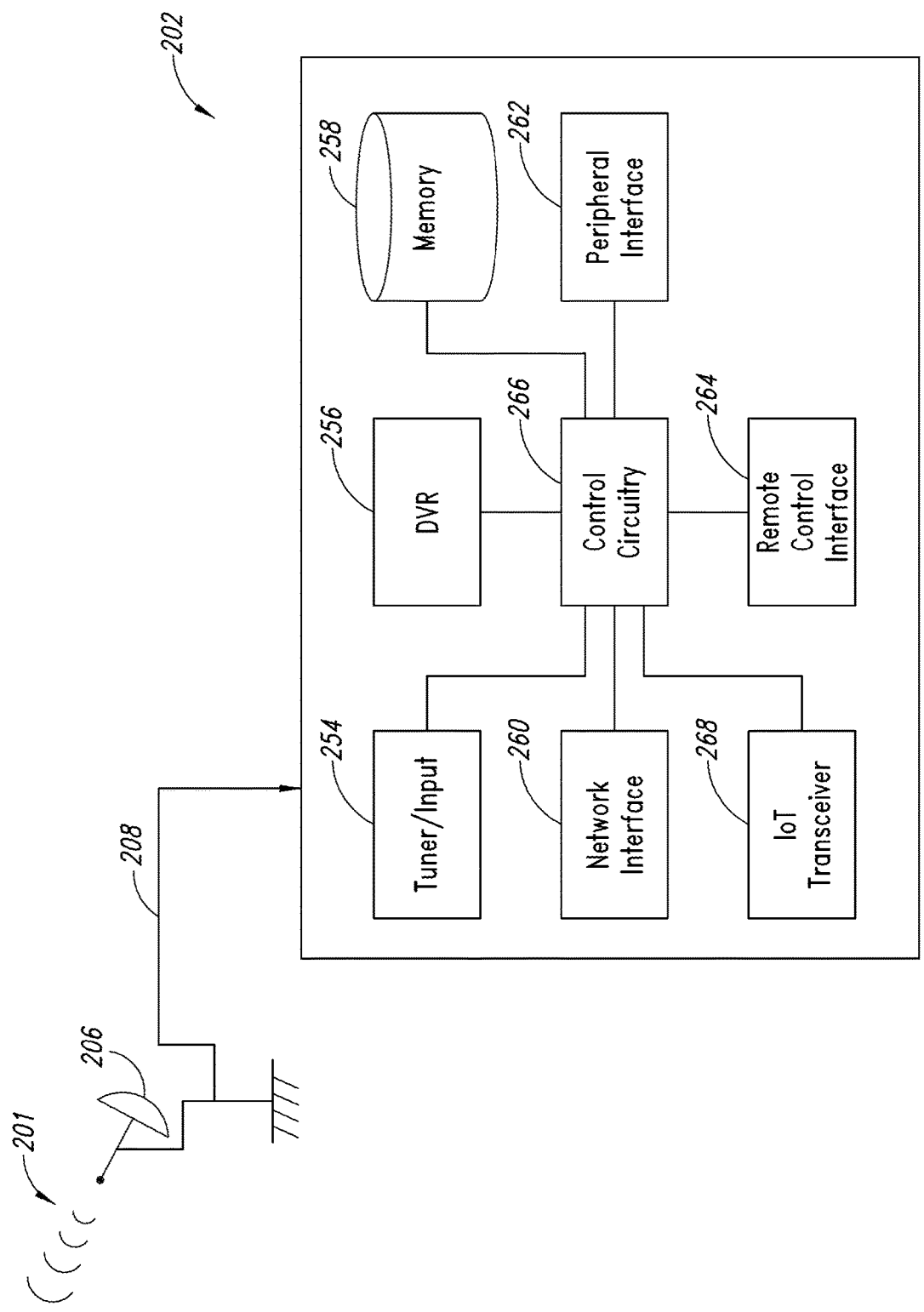
FIG. 2 shows a block diagram of the content receiver.

FIG. 2 shows a block diagram of the content receiver 202. The content receiver 202 includes control circuitry 266, one or more tuning devices 254, an optional internal digital video recorder (DVR) 256, a non-transitory computer readable memory 258, a network interface 260, a peripheral interface 262, a remote control interface 264 and an Internet of Things (IoT) transceiver 268. The control circuitry 266 may be a controller, a microcontroller, a processor or a microprocessor, among others.

Generally, the content receiver 202 can receive one or more television signals from a media provider such as a cable television distributor, a broadcast television distributor or a satellite television distributor. In the embodiment shown, the content receiver system 100 receives signals from a satellite television distributor via the satellite content receiver 202. One skilled in the art will recognize that content receiver 202 can also receive video-digital subscriber line (VDSL), DSL, Internet 252, wireless and other signals from content or video distributors. The satellite content receiver 202 can process television signals and can send the processed signals to peripheral electronic devices, such as the display 204 and the remote control 226. The satellite content receiver 202 also can accept commands from the remote control 226 or other peripheral electronic devices. More detail about the functionality of the satellite content receiver 202 is provided below. One skilled in the art will recognize that many embodiments of the content receiver system 100 are possible and within the scope of this disclosure. Other such embodiments can include, but are not limited to, various combinations or permutations of devices and connections for the delivery, storage, and display of communications, content and other data.

In one embodiment, the content receiver 202 receives media content from the satellite receiving antenna 206. The tuning device 254 tunes into a selected media channel received by the satellite receiving antenna 206 to acquire a satellite signal. The tuning device 254 can initially process the satellite signal. The tuning device 254 can also receive subscriber commands in the form of signals from the control circuitry 266. Signals from the control circuitry 266 can include, but are not limited to, a signal to tune to a transponder as part of the process of selecting a certain channel for viewing on a peripheral device. The tuning device 254 transmits the acquired satellite signal to the control circuitry 266 where the signal can undergo extensive signal processing.

Furthermore, the content receiver 202 can include multiple tuning devices 254. This allows the content receiver 202 to record two or more programs that air simultaneously. Generally, the content receiver 202 can record one show at a single time for each tuning device 254 that the content receiver 202 includes. For example, if the content receiver 202 includes two tuning devices 254, then the content receiver 202 can record two media programs simultaneously. Thus if there is a recording conflict between two programs, the content receiver 202 can still record both programs because it has two tuners. If a recording conflict occurs because the number of tuning devices 254 is less than the number of programs the subscriber 224 wants to view or record, the control circuitry 266 can be programmed to resolve the conflict by prioritizing certain media content according to the subscriber's directions, or automatically, based on various criteria.

The DVR 256 can be used to record programs locally in the content receiver 202. For example, while viewing the programming guide the user may notice a TV show that is not broadcast at a convenient time. By using the remote control 226 the user can command the content receiver 202 to record the TV show to the DVR 256 so that the user may view the TV show at a later convenient time. When the user selects a program to be recorded to the DVR, the content receiver 202 sets a recording timer that causes the content receiver 202 to automatically record the selected program at the scheduled time. At a time convenient to the user, the user can operate the remote control 226 to cause the content receiver 202 to display a list of programs that have been recorded to the DVR. The user can select the desired program from the list of recorded programs and the content receiver 202 will play back the selected program.

The satellite content receiver 202 can be connected to the display 204 and the peripheral devices 220 through a peripheral interface 262. Such peripheral devices can send and receive signals to and from the satellite content receiver 202. For instance, a television can receive video and audio signals, whereas a stereo can receive only audio signals. One skilled in the art will recognize that the peripheral devices can include many types of commercially available electronic devices.

Another peripheral device and connection to the satellite content receiver 202 can include a phone line and modem. Content receiver 202 can use a modem and phone line to communicate with one or more outside entities or systems (e.g., satellite television distributor) using DSL or other protocol.

The remote control interface 264 includes instructions that allow a user to communicate with the satellite content receiver 202, and can be implemented using the peripheral interface 262 or by connecting a separate remote control interface device. The remote control interface 264 can translate an input from the user into a format understandable by the control circuitry 266. The remote control interface 264 can, thus, be considered a user interface (UI). The translation systems can include, but are not limited to, electronic receivers and electronic relays. The remote control interface 264 can receive commands from more than one remote control 226. The remote control 226 can use infrared, UHF, or other communications technology. One skilled in the art will recognize that other means to receive and translate user inputs are possible.

The network interface 260 may be any type of device configured to communicate using an Internet communication protocol. For example, the network interface 260 may be a modem and may be configured to communicate with the Internet 252. The network interface 260 may send and receive packets to a device or server connected to the Internet 252. The packets may be Internet protocol (IP) packets or non-IP packets. A non-IP packet may be data sent in a transparent container without using an IP stack.

The non-transitory computer readable memory 258 may be any type of memory such as static or dynamic memory. The non-transitory computer readable memory 258 may store executable instructions, that when executed by the control circuitry 266, cause the control circuitry 266 (and the content receiver 202) to operate as described herein.

The IoT transceiver 268 may be any type of device, such as a radio frequency (RF) transceiver, configured to communicate using an IoT protocol, such as Narrowband Internet of Things (NB-IoT) or Long Range (LoRa) spread spectrum. Examples of the IoT transceiver 268 include the Semtech SX1272/73 860 Megahertz (MHz) to 1020 MHz Low Power Long Range Transceiver, among others. The IoT transceiver 268 may communicate with the IoT devices 230. When receiving signals transmitted by the IoT devices 230, the transceiver 268 may perform baseband processing on the received signals. The transceiver 268 may demodulate and decode the received signals and output data representative of the received signals to the control circuitry 266. Conversely, the transceiver 268 may receive data from the control circuitry 266. The transceiver 268 may perform baseband processing on the data. For example, the transceiver 268 may modulate and code the data and transmit the data to an IoT device 230.

The content receiver 202 may act as a relay between an IoT device 230 and an external server (not shown). For example, the content receiver 202 may use the network interface 260 to communicate with the server using an Internet protocol. The content receiver 202 may use the IoT transceiver 268 to communicate with the IoT device 230 using an IoT protocol. Equipping the content receiver 202 with an IoT gateway functionality removes the need for a separate or independent IoT gateway in the environment of FIG. 1. In addition, equipping the content receiver 202 with the IoT gateway functionality enables more robust utilization of data originating from or destined to an IoT device 230. As described herein, the content receiver 202 may evaluate the data originating from or destined to the IoT device 230. The content receiver 202 may display data representative of a condition or quantity sensed by the IoT device 230. Accordingly, the user 224 may receive information on the sensed condition or quantity via the display 204.

Figure 3:
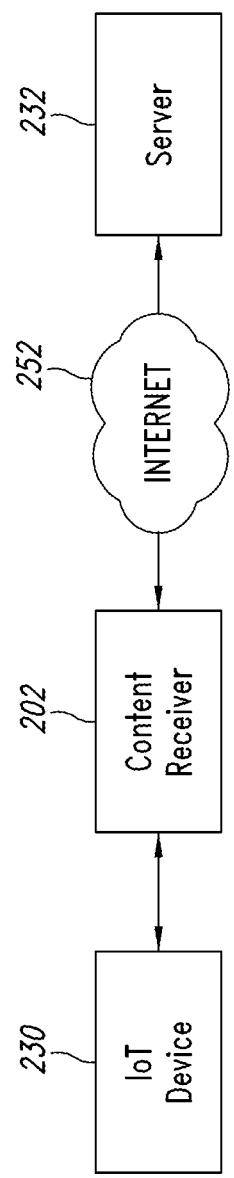
FIG. 3 shows a block diagram of an IoT device communicatively coupled to the content receiver.

FIG. 3 shows a block diagram of an IoT device 230 communicatively coupled to the content receiver 202. The content receiver 202 may be configured with IoT gateway functionality and may accordingly act as an intermediary or a relay between an IoT device 230 and a server 232. The IoT device 230 may transmit one or more signals in accordance with an IoT protocol. The content receiver 202, being equipped with an IoT transceiver 268, receives the one or more signals. The content receiver 202 generates Internet protocol data representative of the received signals. The content receiver 202 sends, using the network interface 260, the Internet protocol data over the Internet 252 to the server 232.

The server 232 may be a provider's server of the IoT device 230. For example, in the event that the IoT device 230 is a motion sensor of a security system (or a surveillance system), the server 232 may be a computer system of a provider of the security the system. Accordingly, the server 232 may receive the data provided by the IoT device 230 and may store or catalog the data for access by the user 224.

The content receiver 202 may function as a gateway for data transmitted by the server 232 and destined to the IoT device 230. For example, the content receiver 202 may receive Internet protocol packet data from the server 232 over the Internet 252. The content receiver 202 (or the control circuitry thereof 226) may operate on the data and evaluate the data. The IoT transceiver 268 may code and modulate data and send a signal representative of the data in accordance with an IoT protocol to the IoT device 230.

The content receiver 202 may glean information from the signals transmitted by the IoT device 230 and data destined to the IoT device 230. The content receiver 202 may evaluate the signals and the data to identify relevant information. The content receiver 202 may then cause the information to be provided to the user 224. For example, if the user 224 is viewing content on the display 204, the content receiver 202 may present the information in the form of an alert to the user 224. The alert may be a notification or an acknowledgement, among others.

Figure 4A:
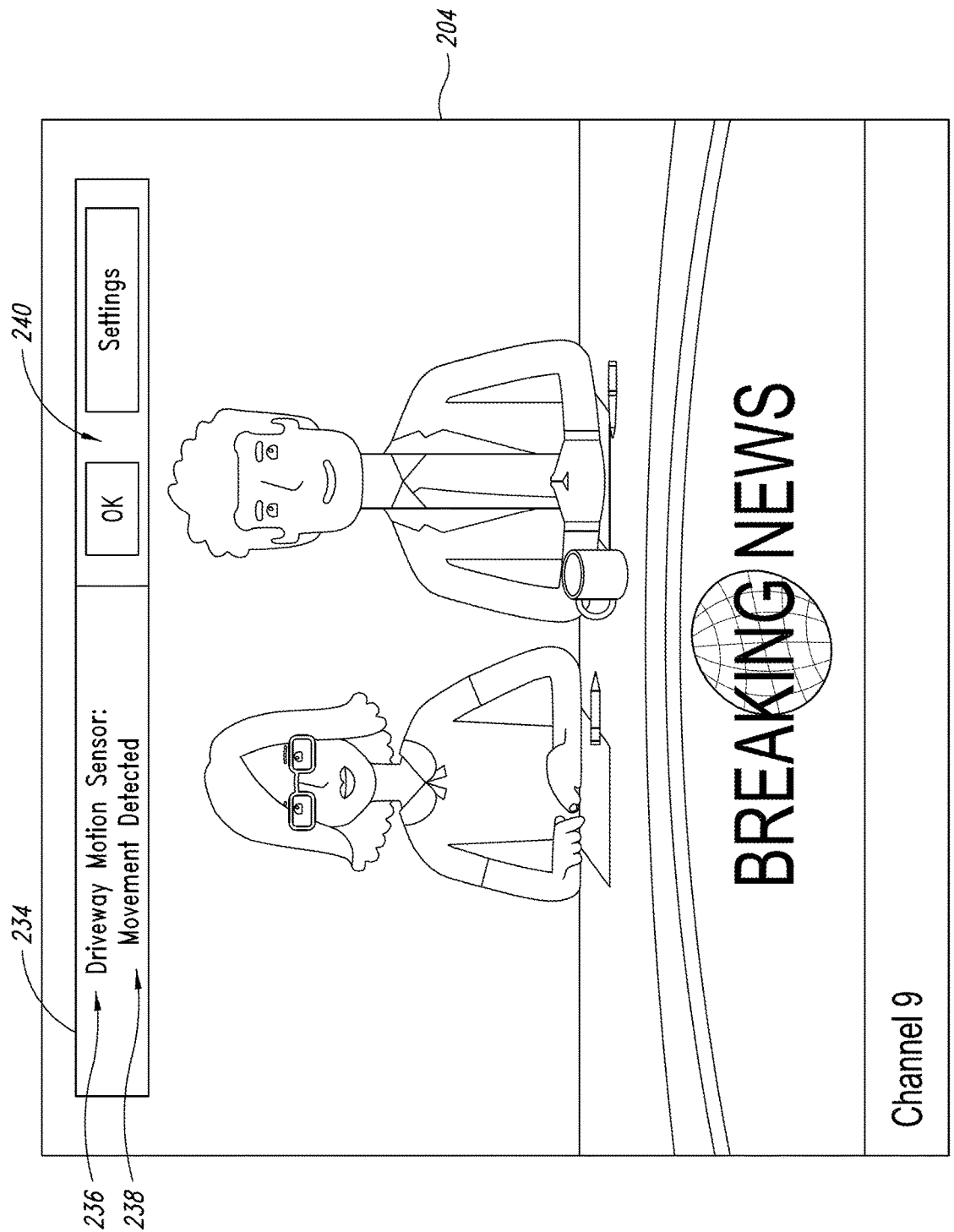
FIG. 4A shows an example of an alert output by the content receiver and displayed by a display.

FIG. 4A shows an example of an alert 234 output by the content receiver 202 and displayed by the display 204. In the example of FIG. 4A, the IoT device 230 is a driveway motion sensor of a home. The IoT device 230 detects movement, which may be the result of the vehicle driving on to the driveway, and transmits a signal indicative of the detected movement. The content receiver 202 receives the signal and evaluates (or parses) the signal to determine the information carried by the signal. The content receiver identifies that the signal carries information indicating that movement has been detected.

The content receiver 202 causes the display 204 to display the alert 234. As described herein, the content receiver may output a signal over the peripheral interface 262, to the display 204, instructing the display 204 to show the alert 234. As shown in FIG. 4A, the display 204 is showing content watched by the user 224 in full-screen mode. The alert 234 is superposed onto the content in a top portion of a display area of the display 204. The alert 234 may occupy a region in the display area that is less than half, a third, a quarter or a fifth of the display area. Even though the alert 234 is shown in a top portion of the display area, the alert 234 may alternatively be shown in a bottom portion, left portion, right portion or a center of the display area. The alert 234 may be a pop-up screen or window. The alert 234 includes an identifier 236 of the IoT device 230 and a condition or quantity 238 sensed by the IoT device 230.

While the alert 234 is displayed, the content receiver 202 may also present a menu 240 to the user 224 including a plurality of command selection buttons. As shown in FIG. 4A, a first command selection button of the plurality of command selection buttons may be an acknowledgment button permitting the user 224 to acknowledge the alert 234. Upon user selection of the acknowledgment button (for example, by pressing the acknowledgment button), the content receiver 202 may cease to display the alert 234. Alternatively, the content receiver 202 may cease display of the alert 234 upon the expiration of a timer. For example, the content receiver 202 may start the timer when the alert 234 is presented. The timer may have any time limit, such as five seconds, and second ends or one minute. The content receiver 202 may automatically cease displaying the alert 234 upon expiration of the timer. A second command selection button of the plurality of command selection buttons may be an IoT device configuration menu access button. The IoT device configuration menu access button may enable the user 224 to access the IoT device configuration menu described herein.

Figure 4B:
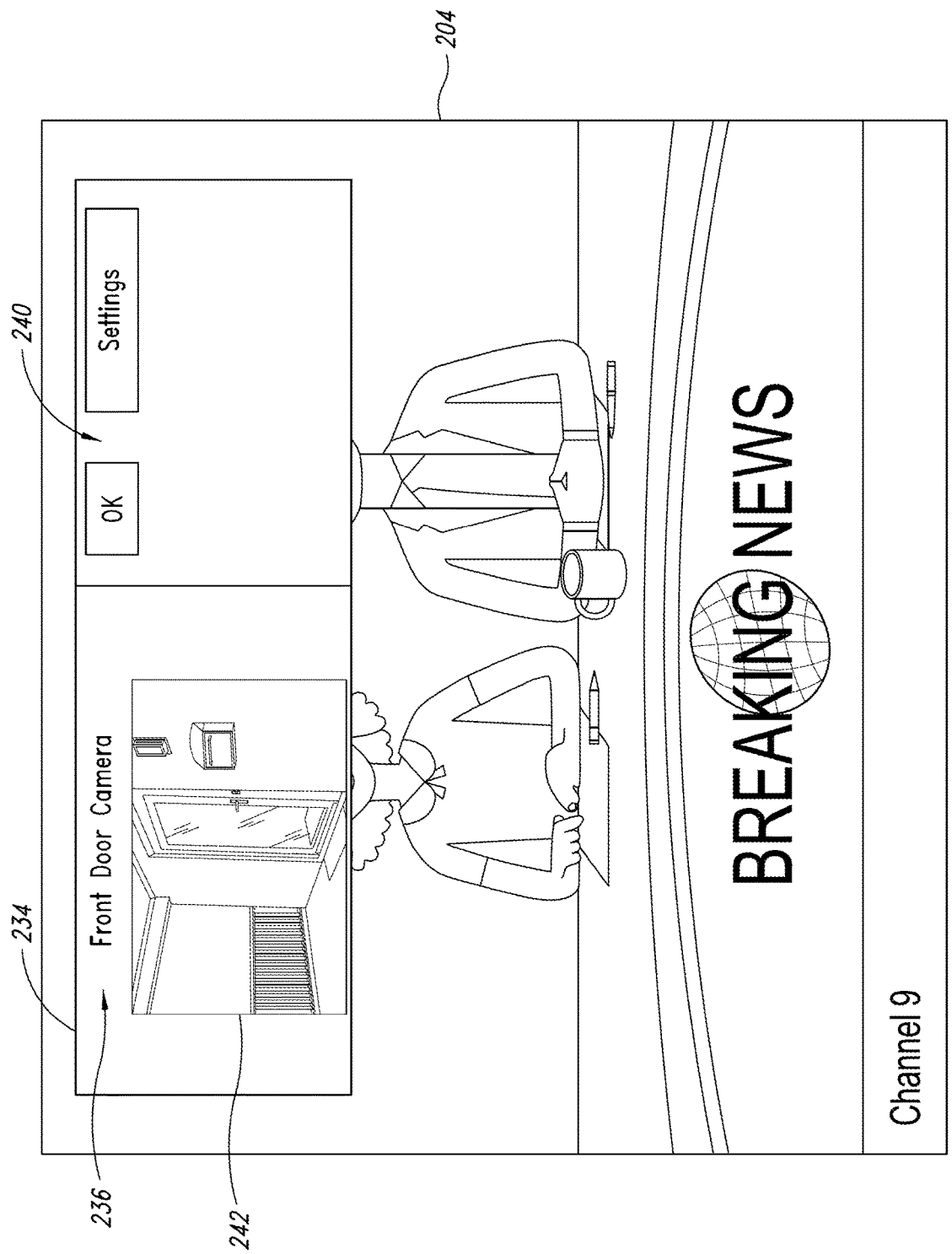
FIG. 4B shows an example of an alert output by the content receiver and displayed by the display.

FIG. 4B shows an example of an alert 234 output by the content receiver 202 and displayed by the display 204. In the example of FIG. 4B, the IoT device 230 is a front door camera of a home. The IoT device 230 may capture an image or video of the front door of the home and may transmit a signal representative of the captured image or video (to a server). The IoT device 230 may be motion-activated, whereby detection of motion by the IoT device 230 (or another device, such as a motion sensor) triggers capturing the image or video. The content receiver 202 receives the signal and evaluates (or parses) the signal to identify the captured image or video.

The content receiver 202 causes the display 204 to display the alert 234. As described herein, the content receiver may output a signal over the peripheral interface 262, to the display 204, instructing the display 204 to show the alert 234. As shown in FIG. 4B, the display 204 is showing content watched by the user 224 in full-screen mode. The alert 234 is superposed onto the content in a top portion of a display area of the display 204 but may be disposed elsewhere in the display area or sized or dimensioned differently as described herein. The alert 234 may be a pop-up screen or window. The alert 234 includes an identifier 236 of the IoT device 230 and an image 242 captured by the IoT device 230. While the alert 234 is displayed, the content receiver 202 may also present the menu 240 described herein.

Figure 4C:
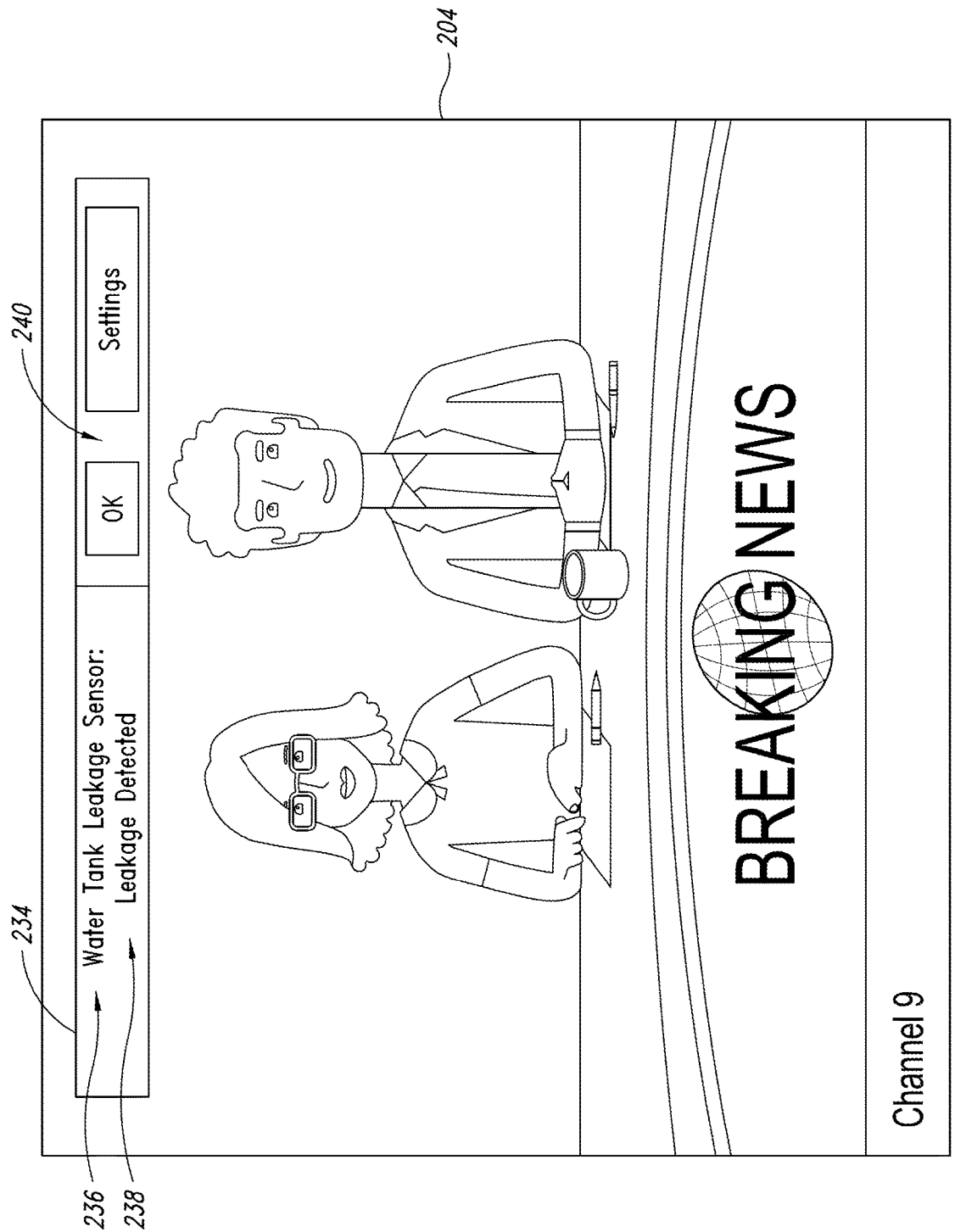
FIG. 4C shows an example of an alert output by the content receiver and displayed by the display.

FIG. 4C shows an example of an alert 234 output by the content receiver 202 and displayed by the display 204. In the example of FIG. 4A, the IoT device 230 is a water tank leakage sensor of a home. The IoT device 230 detects leakage of the water tank. The IoT device 230 may be a moisture, liquid or fluid sensor. The IoT device 230 transmits a signal indicative of whether the leakage is detected. The content receiver 202 receives the signal and evaluates (or parses) the signal to determine the information carried by the signal. The content receiver 202 identifies that the signal carries information indicating that leakage has been detected.

The content receiver 202 causes the display 204 to display the alert 234. As shown in FIG. 4A, the display 204 is showing content watched by the user 224 in full-screen mode. The alert 234 is superposed onto the content in a top portion of a display area of the display 204 as described herein. The alert 234 includes an identifier 236 of the IoT device 230 and the condition or quantity 238 sensed by the IoT device 230. While the alert 234 is displayed, the content receiver 202 also presents the menu 240 to the user 224 including the plurality of command selection buttons.

In an embodiment, the alert 234 may include a notification or any acknowledgement. For example, the alert 234 may include a notification of that the sprinkler will not be turned on due to the fact that a forecast is predicting rain. The user may use the alert 234 to acknowledge or override the notification. For example, the menu may present to the user one button to acknowledge the notification that the sprinkler will not be turned on and another button for the user to override the notification. If the user selects the button to override the notification, the user may be presented with another menu to specify when the IoT device 230 (e.g., sprinkler) is to be activated. For example, the user may be presented with selections of a pre-configured or pre-specified time that represents the time at which the sprinkler is typically turned on. Further, the user may specify the time independently using the menu.

Figure 5:
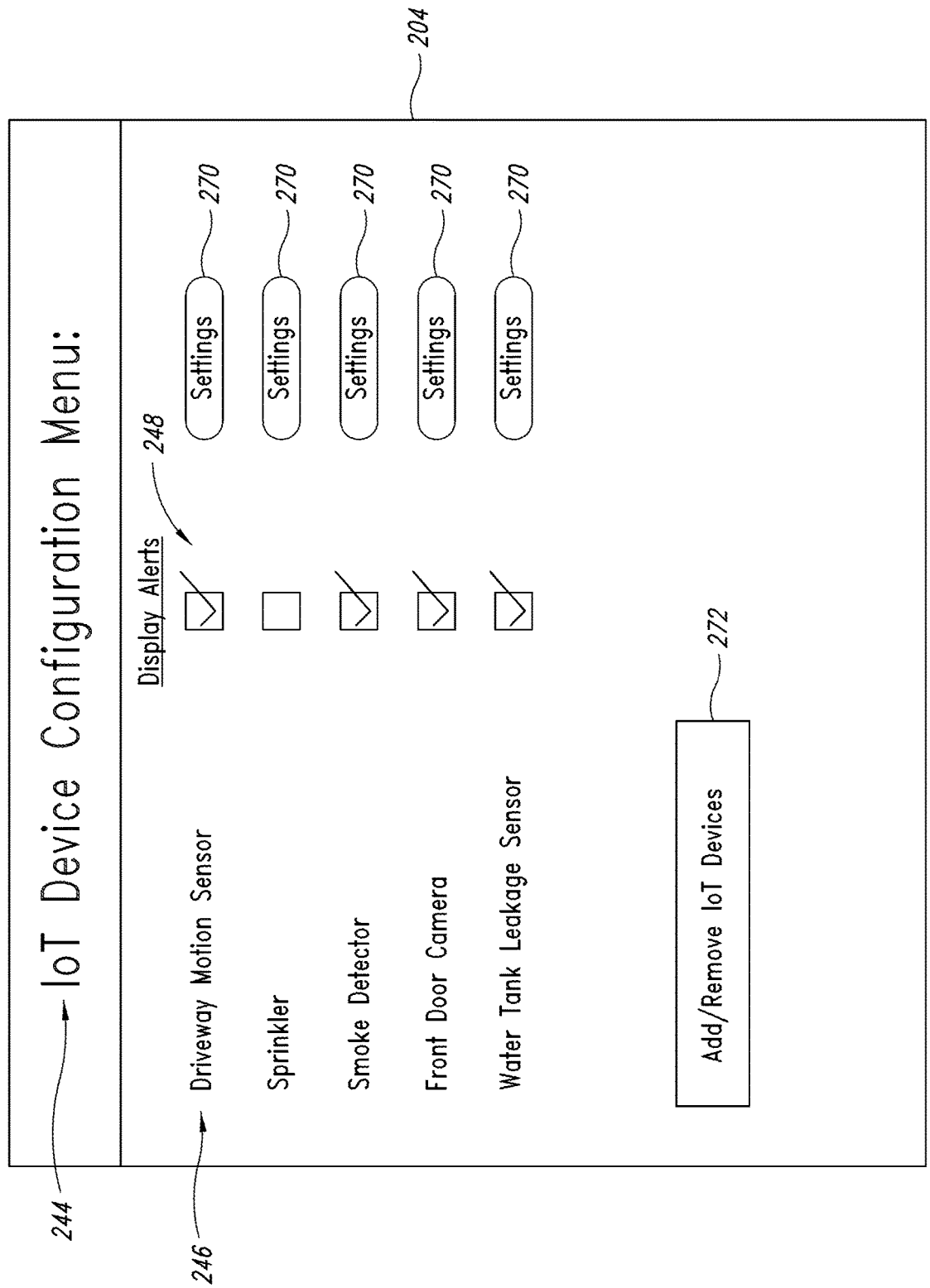
FIG. 5 shows an example of an IoT device configuration menu output by the content receiver and displayed by the display.

FIG. 5 shows an example of an IoT device configuration menu 244 output by the content receiver 202 and displayed by the display 204. The content receiver 202 may present the IoT device configuration menu 244 in response to user 224 selection of the IoT device configuration menu access button described herein. The IoT device configuration menu 244 includes a listing 246 of configured IoT devices 230, a listing of alert configurations 248 for each configured IoT device 230, a settings access command 270 for each configured IoT device 230 and an access command 272 for adding or removing the IoT devices 230.

The user 224 may set the alert configuration 248 for each IoT device 230 (for example, by selecting or unselecting a check box) to define whether alerts corresponding to the IoT device 230 are to be displayed. If the alert configuration 248 is unchecked, the content receiver 202 may refrain from displaying alerts corresponding to the IoT device 230. Furthermore, the content receiver 202 may not parse or evaluate signals received from the IoT device 230 if the alert configuration 248 is not set to alert the user 224 or is unselected due to the fact that the content receiver 202 is not displaying alerts originating from the IoT device 230.

Figure 6:
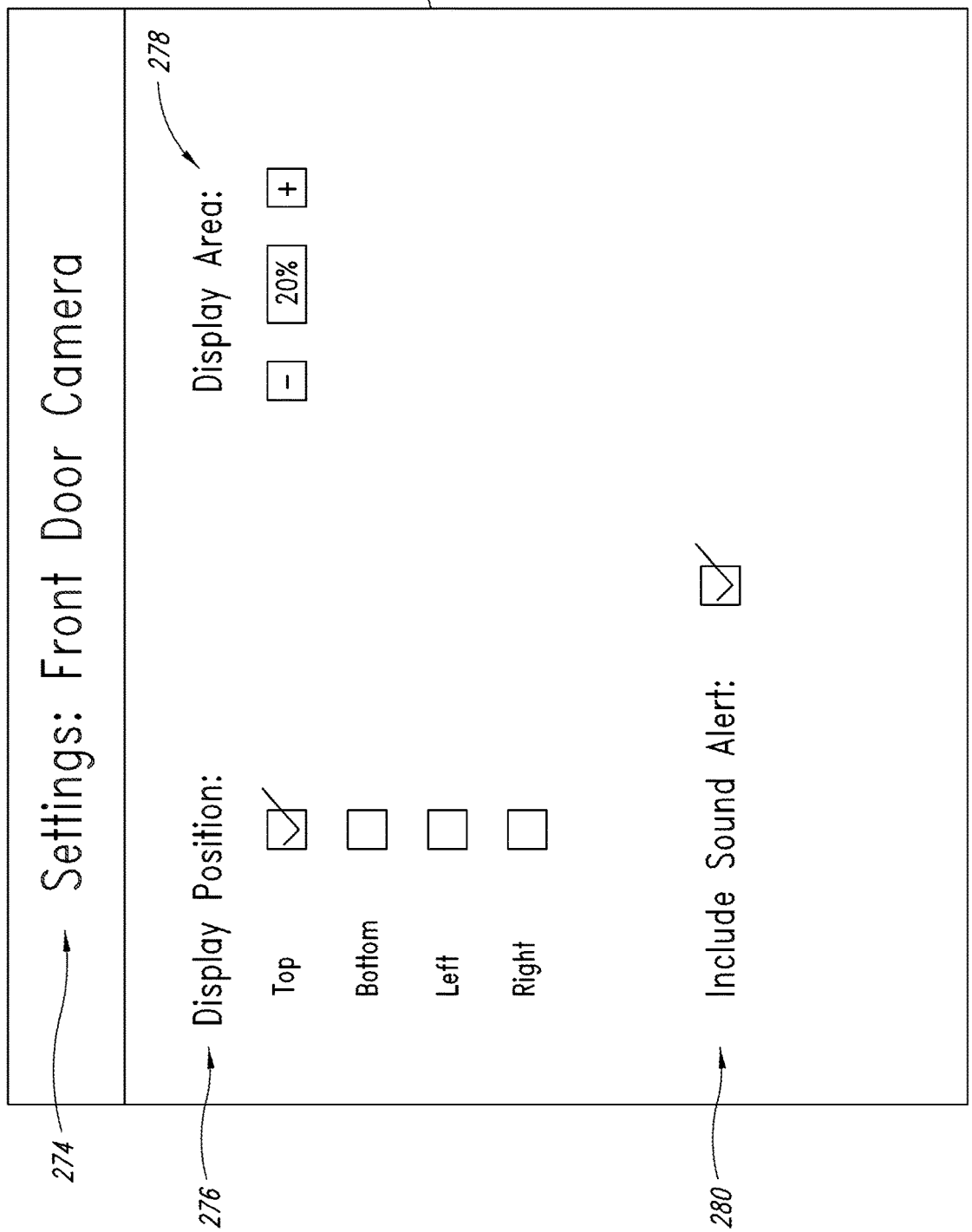
FIG. 6 shows an example of a settings menu output by the content receiver and displayed by the display.

If the user selects the settings access command 270, the content receiver 202 displays a settings menu 274 described herein with reference to FIG. 6 for the IoT device 230. If the user selects the access command 272 for adding or removing the IoT devices 230, the content receiver 202 displays a menu for adding or removing IoT devices 230. For example, the user 224 may remove devices such that alerts originating from the devices are not displayed. In addition, the user 224 may add more IoT devices 230, whereby the user 224 may provide device identification information and service identification information and the content receiver 202 may begin displaying alerts originating from the added IoT devices 230.

FIG. 6 shows an example of a settings menu 274 output by the content receiver 202 and displayed by the display 204. The settings menu 274 includes a display position configuration 276 for an alert 234, an alert display area configuration 278 and a sound alert configuration 280 the alert 234. The display position configuration 276 for the alert 234 permits the user 224 to define a position for the alert on a display area of the display 204. The display position configuration 276 permits the user to define where the alert is displayed on the display area. The user 224 may select between a top position, a bottom position, a left position or a right position on the display area. The content receiver 202 displays the alert 234 and the defined position.

The alert display area configuration 278 permits the user to define an alert display area or increase or decrease the alert display area. For example, the alert display area may be set by the user 224 as a percentage of the display area of the display. Because of the alert 234 is superposed on content displayed on the display area and may interfere with user experience or view of the content, it is desirable to permit the user 224 to select the alert display area. The sound alert configuration 280 may permit the user to configure the content receiver 202 to include the sound alert when displaying the alert 234. For example, when the sound alert is configured, the content receiver 202 may cause the display 204 to play a sound or a tone when displaying the alert 234.

Figure 7:
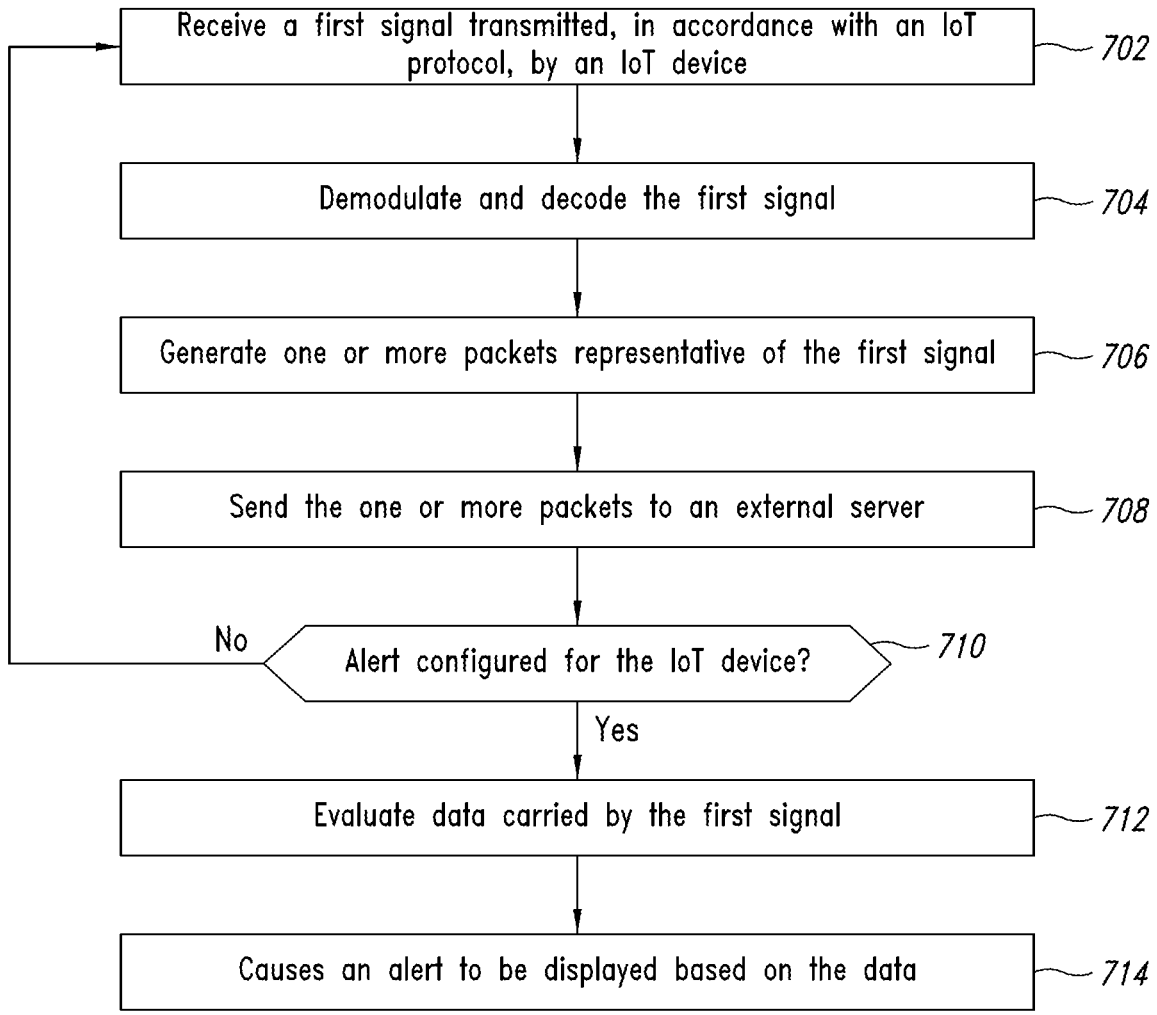
FIG. 7 shows a flow diagram of a method implemented by the content receiver configured as an IoT gateway.

FIG. 7 shows a flow diagram of a method 700 implemented by a content receiver 202 configured as an IoT gateway. In the method 700, at 702, the content receiver 202 receives a first signal transmitted, in accordance with an IoT protocol, by an IoT device 230. As described herein, the content receiver 202 may include an IoT transceiver, whereby the IoT transceiver is compliant with the IoT protocol and receives the first signal. The content receiver 202 demodulates and decodes the first signal at 704. The content receiver 202, at 706, generates one or more packets representative of the first signal, which may be IP packets or non-IP packets. When preserving a battery life or a charge of the IoT device 230 is sought, a non-IP packet may be used due to the fact that a non-IP protocol has less overhead and is more efficient than the IP protocol. However, if the IoT device 230 is not in a battery preservation mode or energy use reduction mode, IP packets may be generated.

The content receiver 202, at 708, sends the one or more packets to an external server. As described herein, the content receiver 202 may include the network interface 260 operable to transmit and receive data over the Internet 252. The content receiver 202 may send the one or more packets to the external server using the network interface 260.

The content receiver 202, at 710, determines whether an alert is configured for the IoT device 230. If a negative determination is made at 710, the method 700 reverts to receiving further signals transmitted by the IOT device 230 at 702. Conversely, if a positive determination is made at 710, the content receiver 202, at 712, evaluates the data carried by the first signal and, at 714, causes an alert to be displayed based on the data. As described herein, causing the alert to be displayed may include displaying a popup representing the alert on the display and superposing the popup on content displayed on the display.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an Internet of Things (IoT) device including a transceiver configured to transmit a first signal in accordance with an IoT protocol; and
a content receiver configured as an IoT gateway including:
an IoT transceiver configured to:
receive the first signal;
demodulate and decode the first signal; and
output data representative of the first signal;
a controller configured to:
cause an IoT device configuration menu to be displayed, the IoT device configuration menu presenting a command for a user to specify, for the IoT device, whether an alert display is configured for the IoT device, an alert display area as a percentage of a display area of a display coupled to the content receiver and a display position of an alert on the display;
receive user specification of whether the alert display is configured for the IoT device;
receive the data representative of the first signal;
determine whether the alert display is configured for the IoT device as specified by the user;
determine to display the alert on the display as the percentage of the display area and at the display position on the display based on the user specification after determining that the alert display is configured for the IoT device; and
generate and output one or more packets representative of the first signal; and
a network interface configured to:
receive the one or more packets representative of the first signal; and send the one or more packets to an external server.

2. The system according to claim 1, wherein the controller is configured to cause the alert to be displayed by displaying a popup representing the alert on the display.

3. The system according to claim 2, wherein the controller is configured to superpose the popup on content displayed on the display.

4. The system according to claim 1, wherein the controller is configured to:
 display the alert together with a first acknowledgement input permitting the user to acknowledge the alert; and
 in response to receiving selection from the user of the first acknowledgement input, cease display of the alert.

5. The system according to claim 1, wherein the IoT device configuration menu presents a command for the user to add and remove IoT devices with which the content receiver communicates.

6. The system according to claim 1, wherein the controller is configured to:
 display the alert including an image or video captured by the IoT device.

7. The system according to claim 1, wherein the IoT device is a sensor and the first signal represents a condition or quantity sensed by the IoT device.

8. The system according to claim 1, wherein the IoT device configuration menu presents the command for the user to specify, for the IoT device, the display position of the alert on the display as one of a top, bottom, left or right position.

9. The system according to claim 1, wherein the controller is configured to, in response to determining that the alert display is configured for the IoT device, cause the alert to be displayed on the display in accordance with the user specification of the alert display area and the display position.

10. A method, comprising:
 causing an Internet of Things (IoT) device configuration menu to be displayed, the IoT device configuration menu presenting a command for a user to specify, for an IoT device, whether an alert display is configured for the IoT device, an alert display area as a percentage of a display area of a display coupled to a content receiver and a display position of an alert on the display;
 receive user specification of whether the alert display is configured for the IoT device;
 receiving, by the content receiver configured as an IoT gateway, a first signal transmitted by the IoT device in accordance with an IoT protocol;
 demodulating and decoding the first signal;
 determining whether the alert display is configured for the IoT device as specified by the user;
 determining to display the alert on the display as the percentage of the display area and at the display position on the display based on the user specification after determining that the alert display is configured for the IoT device;
 generating one or more packets representative of the first signal; and
 sending the one or more packets to an external server.

11. The method according to claim 10, comprising:
 causing the alert to be displayed by displaying a popup representing the alert on the display.

12. The method according to claim 11, comprising:
 superposing the popup on content displayed on the display.

13. The method according to claim 10, comprising:
 displaying the alert together with a first acknowledgement input permitting the user to acknowledge the alert; and
 in response to receiving selection from the user of the first acknowledgement input, ceasing display of the alert.

14. The method according to claim 10, wherein the IoT device configuration menu presents a command for the user to add and remove IoT devices with which the content receiver communicates.

15. The method according to claim 10, comprising:
 displaying the alert including an image or video captured by the IoT device.

16. The method according to claim 10, wherein the IoT device is a sensor and the first signal represents a condition or quantity sensed by the IoT device.

17. A content receiver, comprising:
 an Internet of Things (IoT) transceiver configured to:
  receive a first signal transmitted by an IoT device in accordance with an IoT protocol;
  demodulate and decode the first signal; and
  output data representative of the first signal;
 a controller configured to:
  cause an IoT device configuration menu to be displayed, the IoT device configuration menu presenting a command for a user to specify, for the IoT device, whether an alert display is configured for the IoT device, an alert display area as a percentage of a display area of a display coupled to the content receiver and a display position of an alert on the display;
  receive user specification of whether the alert display is configured for the IoT device;
  receive the data representative of the first signal;
  determine whether the alert display is configured for the IoT device as specified by the user;
  determine to display the alert on the display as the percentage of the display area and at the display position on the display based on the user specification after determining that the alert display is configured for the IoT device;
  generate one or more packets representative of the first signal; and
  output the one or more packets representative of the first signal; and
 a network interface configured to:
  receive the one or more packets representative of the first signal; and
  send the one or more packets to an external server.

18. The content receiver according to claim 17, wherein the controller is configured to:
 cause the alert to be displayed by displaying a popup representing the alert on the display; and
 superpose the popup on content displayed on the display.

19. The content receiver according to claim 17, wherein the controller is configured to:
 display the alert together with a first acknowledgement input permitting the user to acknowledge the alert; and
 in response to receiving selection from the user of the first acknowledgement input, cease display of the alert.

20. The content receiver according to claim 17, wherein the controller is configured to:
 display the alert including an image or video captured by the IoT device.

* * * * *